United States Patent Office 3,492,760
Patented Feb. 3, 1970

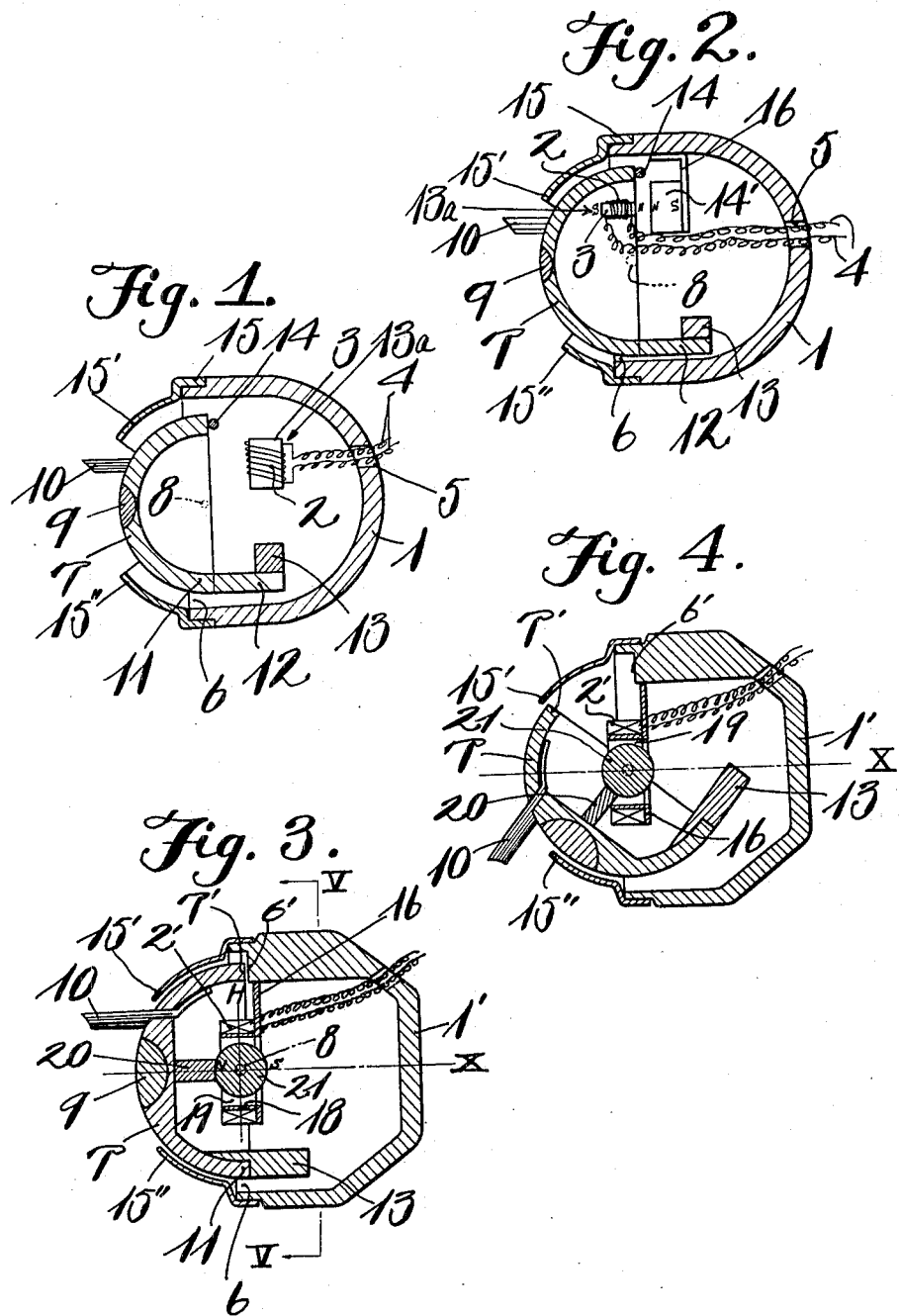

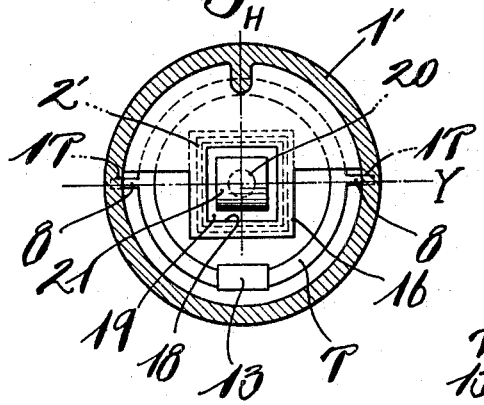
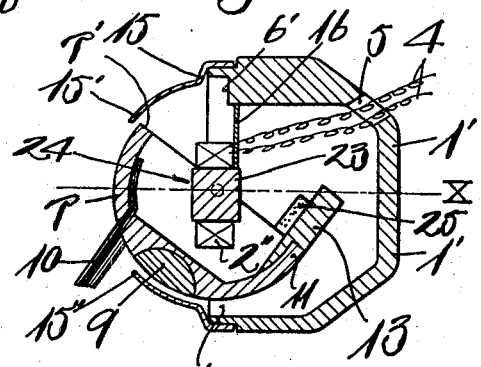
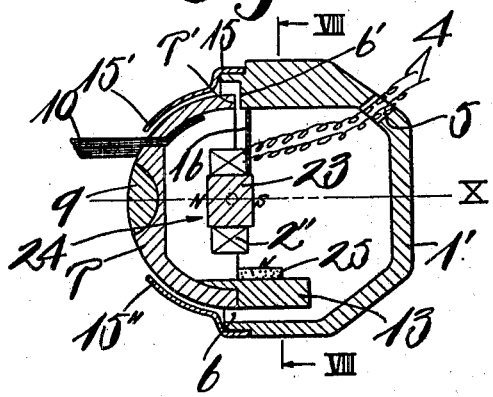

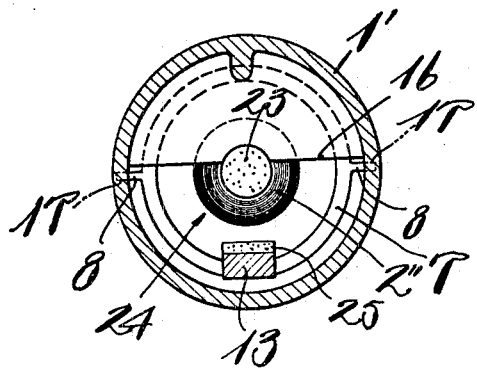
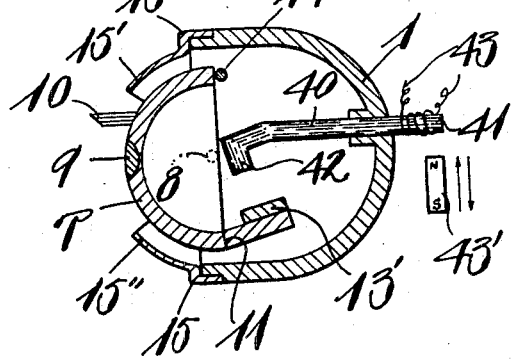
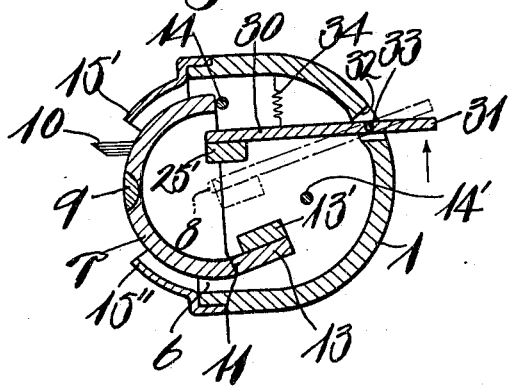

3,492,760
SELF-CONTAINED MAGNETICALLY-OPERATED DOLL EYE ASSEMBLY
Tatsuro Nishitani, 12 Motoshio-cho, Yotsuya, Shinjuku-ku, Tokyo, Japan
Filed Aug. 29, 1967, Ser. No. 664,145
Int. Cl. H63h 33/26, 3/40
U.S. Cl. 46—235                                        5 Claims

ABSTRACT OF THE DISCLOSURE

This invention proposes a movable eye assembly adapted to be set in a desired object such as doll, figure, mask, display stand and the like, comprising an eye socket, an eyeball and an operating mechanism therefor including a magnetically operating element and a magnetically operated element, said eyeball being pivotally mounted in said eye socket, said operating element and said operated element being attached to said eye socket and said eyeball, respectively, and said operating mechanism being adapted to be controlled by electrical, mechanical or manual means, thereby enabling said eyeball to be magnetically turned within said eye socket.

---

This invention relates to an eye assembly and more particularly to a novel movable eye assembly adapted to be set in a desired object such as doll, figure, etc., comprising an eye socket, an eyeball and an operating mechanism therefor including a magnetically operating element and a magnetically operated element, said eyeball being pivotally mounted in said eye socket, and said operating element and said operated element being attached to said eye socket and said eyeball, respectively.

Heretofore, an animated eye assembly which is capable of winking, blinking or closing has been used in a wide variety of figure toys, especially in so-called sleeping dolls or the like. However, such conventional eye assembly is so constructed as to cause an eyeball to make movement by gravity. Accordingly, only when the doll is inclined or laid down, the eyeball is moved, causing the eye to wink, blink or close. Consequently, such gravity-operated eye assembly is not available for a fixedly set or installed figure or object which is unmovable or not easy to be moved, such as mannequin, ornamental mask, display stand, etc.

This invention has been devised to eliminate such drawbacks and, for this purpose, provides a novel magnetically operated eye assembly.

It is therefore one object of the present invention to provide a magnetically operated eye assembly which is capable of moving the eyeball for winking, blinking or closing in any pose or position of a figure or object in which they eye assembly is set.

It is another object of the present invention to provide a magnetically operated eye assembly which is compact, and which can be easily set in any of figure or object needing eyes, such as doll, toy animal, mannequin, ornamental mask, display stand, etc.

It is a further object of the present invention to provide a movable eye assembly of the character described, which has a magnetically operated mechanism adapted to be controlled by electrical, mechanical or manual means.

It is a still further object of the present invention to provide a movable eye assembly of the kind described which can be manufactured and sold at a reasonable cost.

A movable eye assembly according to the present invention comprises a bowl-like eye socket having a front opening and an eyeball pivotally mounted therein in such a manner that it is partly exposed to view through said front opening, said eyeball being provided at its suitable portion with a magnetic element functioning as a magnetically operated element and adapted to be attracted or repulsed by a magnetic force exerted between said magnetic element and another magnetic element disposed within the hollow portion of said eye socket and functioning as a magnetically operating element. The magnetic attractive or repulsive action causes the eyeball with eyelashes to turn within the eye socket, thus enabling the eye to wink, blink or close.

In order to facilitate understanding of the present invention, the illustration and description are made herein only for exemplary embodiments in which the eyeball is pivotally mounted within the eye socket by means of horizontal pivot pins and is caused to make a vertical oscillation. However, it is to be noted that the eyeball can, of course, be mounted by means of vertical pivot pin or pins instead of such horizontal pivot pins so that it can make a horizontal oscillation.

The foregoing and other objects and advantages of the present invention will be apparent from the following description and the annexed drawings, in which:

FIGURE 1 is a longitudinal cross-sectional view of a movable eye assembly as one embodiment of the present invention, illustrating the internal structure thereof, wherein an electromagnet is disposed within an eye socket;

FIGURE 2 is a longitudinal cross-sectional view of a modification of FIG. 1, wherein an electromagnet is disposed within an eyeball;

FIGURE 3 is a longitudinal cross-sectional view of another embodiment of the present invention, wherein a permanent magnet is attached to an eyeball and is positioned in the internal space of an electromagnet coil disposed within an eye socket;

FIGURE 4 is a longitudinal cross-sectional view of the embodiment shown in FIG. 3, illustrating the moved position of the eyeball;

FIGURE 5 is a sectional view taken along the line V—V of FIG. 3, illustrating the relative position of the core magnet to the electromagnet coil;

FIGURE 6 is a longitudinal cross-sectional view of a further embodiment of the present invention, wherein an eye socket is provided therein with an electromagnet including a core adapted to attract a piece of a magnetic substance attached to an eyeball at a suitable portion thereof;

FIGURE 7 is a longitudinal cross-sectional view of the embodiment shown in FIG. 6, illustrating the moved position of the eyeball;

FIGURE 8 is a sectional view taken along the line VIII—VIII of FIG. 6;

FIGURE 9 is a longitudinal cross-sectional view of a still further embodiment of the present invention, wherein an eye socket is provided therein with a permanent magnet carried by a swingable lever at a tip portion thereof; and FIGURE 10 is a longitudinal cross-sectional view of a modification of the embodiment shown in FIG. 9, wherein a yoke is substituted for the swingable lever of FIG. 9, said yoke having an end portion projecting outwardly of the eye socket and adapted to be magnetized through said end portion.

In the figures of the drawings the same reference numerals relates to corresponding parts or portions.

Referring to FIGURE 1 there is shown one of preferred embodiments of the present invention, which comprises an eye socket 1 and an eyeball 7, said eyeball 7 being adapted to turn within an eye socket under the influence of an electromagnet, to thereby cause the eye to make a blinking or closing action. The eye socket 1 is substantially semispherically shaped hollow member and is made of a suitable anti-magnetic material such as plastics, glass, etc. Within the eye socket is disposed an electromagnet 13a comprising a coil 2 and a core 3. The ends of lead wires 4 of the coil 2 are drawn out of the socket 1 through an aperture 5 formed in a suitable portion of the rear wall thereof. Within the front opening 6 of the socket is disposed a hollow semi-spherical eyeball 7, which is pivotally supported by means of pivot pins 8 projecting horizontally therefrom and bearings therefor, not shown, formed in the side walls of the socket 1. The eyeball 7 is formed of such an anti-magnetic material as that of the eye socket, and a glassy pupil member 9 is fixedly mounted in a convex formed in the central outer portion of the eyeball. Furthermore, eyelashes member 10 is planted on the eyeball in the manner depicted.

The eyeball is provided at its rear bottom portion with a horizontally elongated tail portion 12, to the end of which is atached a piece of a magnetic metal 13. Such piece of metal 13 is adapted to be attracted by the electromagnet 13a so that the eyeball will turn in a counterclockwise direction, causing the eye to close. This piece of metal functions also as a counterweight which allows the eyeball to make a movement in a clockwise direction. The pivotal movement of the eyeball caused by such counterweight is limited by a stop 14 adapted to engage therewith. Therefore, when the metal is made free from the attractive force produced by the electromagnet 13a by operating a switch of an outer circuit therefor, the eyeball is automatically returned to the original position under the action of said counterweight causing the eye to open.

To the circumference of the opening of the eye socket is attached a cover 15 comprising an upper part 15' and a lower part 15" in order that the convex portion of the eyeball can be partly seen from the outside through an opening formed between both said cover parts.

As to the parts or portions of the following embodiments which correspond to or are similar to the parts or portions described above in respect of the embodiment shown in FIG. 1, such as an eye socket 1 including cover parts 15', 15", an eyeball including an eye pupil 9 and eyelashes 10, pivot pins 8, 8, a stop 14, etc., a detailed explanation will not be made hereunder to avoid repetition.

Referring now to FIG. 2 there is shown another embodiment of the present invention. As in FIG. 1, an eyeball 7 has at its tail end portion 12 a counterweight 13 adapted to keep the balance of the eyeball. Different from the foregoing embodiment, the eyeball 7 has at an upper portion of its hollow an electromagnet 13a comprising a coil 2 and a core 3. Said electromagnet is adapted to be repulsed by a piece of magnet 14' secured to an eye socket to thereby cause the eyeball 7 to turn in a counterclockwise direction. The magnet 14' is of a permanent magnet material such as ferrite etc. and securely disposed within the eye socket 1 through the medium of a bracket 16. The magnet 14' and the electromagnet 13a are arranged so that the faces having the same polarity are opposite to each other. The ends of lead wires 4 of the electromagnet are drawn out of the eye socket 1 through the aperture 5.

In FIGURES 3 to 5, there is depicted still another embodiment of the present invention, wherein the eye socket 1' has a polygonal form in a cross-section.

As clearly seen in FIG. 5, pivot pins 8, 8 projecting horizontally from eyeball 7 are received by bearings 17, 17, respectively so that the eyeball 7 is pivotable on its pins as in other foregoing and following embodiments. The eyeball is normally balanced within an elongated counterweight 13 extending rearwardly from its lower 11, as shown in FIG. 3.

A bracket 16 extends downwardly from an upper wall of the eye socket 1'. On the bracket is mounted a bobbin 18 having an electromagnet coil 2' therearound. The bobbin 18 is made in the square form and has therein a hollow portion 19, as shown in FIG. 5, and is arranged so that the axis of said bobbin or electromagnet coil 2' corresponds with the horizontal axis X passing through the central portion of said eyeball.

The back of the eyeball 7 is provided at its central portion with an arm 20 extending perpendicular thereto. To the end of said arm is attached a magnet 21 which is positioned within the hollow portion 19 of said bobbin. The magnet 21 functions as a rotor in the magnetic field to be induced within the coil 2' and is adapted to cause the eyeball 7 to rotate on its pins 8, 8. The rotor 21 is of a cylindrical solid structure the axis Y of which corresponds with the axis of the pins 8, 8 pivotally supporting the eyeball, and its N and S poles are situated in the front and rear regions defined by a central line H thereof, respectively. The rotor 21 is caused, therefore, to rotate on its axis by magnetically attracting or repulsing force exerted between the magnet rotor itself and the coil 2'.

FIG. 4 illustrates the closed position of the eye, that is, the state in which the eyeball is pivotally moved in a counterclockwise direction against the balancing action of the weight 13 by the magnetic force exerted between the rotor 21 and the coil 2'. When the electromagnet coil 2' is made inoperative, that is, demagnetized, the weight 13 causes the eyeball to be returned to its original position or the open position of the eye, whereby the upper edge portion 6' of the opening of the eye is brought to engage the upper edge 7' of the eyeball 7, as shown in FIG. 3.

Referring now to FIGURES 6 to 8, there is depicted a further embodiment of the present invention, wherein a permanent magnet 25 is attached to a tail portion 13 of the eyeball which is adapted to be attracted by an electromagnet 24 disposed within the eye socket having the same shape as that shown in FIG. 3, thereby causing the eyeball to make a pivotal movement. In this embodiment, the electromagnet 24 including a coil 2' and a core 23 is attached to a bracket 16 in such a manner that the horizontal axis of the core 23 corresponds with the horizontal axis of the eyeball 7 in its normal position. The tail portion 13 of said eyeball functions as a counterweight therefor. FIG. 7 shows the closed position of the eye, wherein the magnet 25 is attracted by the magnetic field induced in the electromagnet 24. When the electromagnet is switched off, the eyeball is caused to be returned to the original position under the action of the weight 13, as shown in FIG. 6.

In all the foregoing embodiments illustrated in FIGURES 1 to 8, an electromagnet element is used as an actuator, and substantially same are the manners of operations thereof, which will, therefore, be discussed hereunder in the gross. A pair of eye assemblies according to any of the foregoing embodiments of the present invention are set in doll etc. by suitable means. The ends of lead wires 4 of an electromagnet involved in the eye are brought to the outside and connected to a D.C. source through a suitable switch means. The operation of such switch means causes said electromagnet to selectively operative or inoperative to thereby control the movement of the eyeball, thus enabling the normally open eye to make the closing or winking action. As to the operation, various modifications are suggested; for example, the eyes of a plurality of dolls, etc. can be collectively operated by one switch; for another example, if a timer switch is employed, the eye can be automatically and periodically operated in accordance with a predetermined programme.

Referring now to FIG. 9, there is shown a further embodiment which includes a swingable lever 31 carrying at its tip portion a magnet 25' adapted to attract a magnetic element 13' mounted on the tail portion 13 of the eyeball 7. The lever 31 disposed within the eye socket 1 is projecting outwardly through the aperture 32 and pivotally mounted by means of a pivot pin 33 in the manner depicted. The lever is provided at its intermediate portion with a spring 34 which is at its end secured to the upper wall of the socket so that the lever is resiliently supported. The magnetic element 13' may be a permanent magnet. In operation, when the lever is turned to a chain line position against the action of the spring 31 by manually or mechanically moving the outside portion thereof in the direction indicated by the arrow, the magnetic element 13' is attracted by the magnet 25' causing the eyeball 7 to rotate on its pivot pins 8, 8 to thereby enable the eye to make the blinking action etc. In this case, the pivotal movement of the eyeball in a counter-clockwise direction also is limited by a stop 14' provided within the eye socket at its suitable portion so that the magnet 25' and the magnetic element 13' may not stick to each other.

In an embodiment shown in FIG. 10, the yoke 40 is made of a material having a high magnetic permeability and securely attached to the eye socket in the manner depicted. When the yoke is magnetized at its rear end portion 41 by an electromagnet coil 43 or a permanent magnet 43', the forward end portion 42 thereof is caused to have the opposite magnetic pole to thereby attract the magnetic element 13' mounted on the tail portion of the eyeball 7. In this case the operation of said permanent magnet 43' may be controlled by any of mechanical or manual means.

Thus, since the eye assembly as described, according to the present invention, can be magnetically operated it can be advantageously employed in a fixedly set or installed figure or object for which the conventional gravity-operated eye assembly is not available and, moreover, the figure or object fitted therewith is very simple in operation and attractive as well as realistic in appearance or countenance.

What is claimed is:
1. A self-contained magnetically-operated doll eye assembly adapted for incorporation in a doll, a figure toy, a mask, a display stand or the like, comprising an eye socket of a non-magnetic material, an eyeball of a non-magnetic material pivotally-mounted on a horizontal axis within said eye socket, and normally displaying a pupil area, metallic weight means for constantly urging said eyeball to pivot in one direction of rotation thereof, said metallic weight means being capable of being magnetized and secured to and rotatable with said eyeball, and magnetic control means secured to said eye socket and actionable to provide a magnetic field in proximity to said metallic weight to cause said eyeball to pivot within said eye socket against the action of said metallic weight means, whereby said eye assembly may be caused to appear closed.

2. A self-contained magnetically-operated doll eye assembly according to claim 1, and said magnetically controlled means being an electric magnet lying within the eye socket.

3. A self-contained magnetically-operated doll eye assembly according to claim 1, said magnet controlled means including a magnetic rotor axially aligned with the eyeball axis, an arm extending from the inner space of the eyeball supporting said rotor, and an electric magneto coil carried by the socket and surrounding the rotor.

4. A self-contained magnetically-operated doll eye assembly according to claim 1, said magnetic controlled means including a magnetic core carried on the socket to the pivot axis and an electric magnet secured to the core.

5. A self-contained magnetically-operated doll eye assembly according to claim 1, and said magnetically controlled means being a permanent magnet pivotally and biasly supported on a swingable lever extending from the permanent magnet through the socket to provide a manipulable handle end exteriorly of the socket.

References Cited

UNITED STATES PATENTS 3,292,610  12/1966  Newman _____ 46—169
3,383,793   5/1968  Bonnano _____ 46—235

F. BARRY SHAY, Primary Examiner

R. F. CUTTING, Assistant Examiner

U.S. Cl. X.R.

46—169